United States Patent [19]
Achener

[11] 4,265,649
[45] May 5, 1981

[54] METHOD FOR PREPARING A PREFORM FOR OPTICAL WAVEGUIDES
[75] Inventor: Claude Achener, Paris, France
[73] Assignee: Saint-Gobain Industries, Neuilly-sur-Seine, France
[21] Appl. No.: 110,774
[22] Filed: Jan. 9, 1980
[30] Foreign Application Priority Data Jan. 10, 1979 [FR] France ............................... 79 00525

[51] Int. Cl.³ ............................................. C03C 25/02
[52] U.S. Cl. ........................................ 65/18; 65/3 A; 65/13; 65/64; 427/163
[58] Field of Search ................... 65/2, 3 A, 13, 18, 64

[56] References Cited
U.S. PATENT DOCUMENTS

| 3,954,431 | 5/1976 | Fleming et al. | 65/18 |
| 4,114,980 | 9/1978 | Asom et al. | 65/3 A X |
| 4,162,908 | 7/1979 | Rau et al. | 65/3 A X |

FOREIGN PATENT DOCUMENTS 2178175 11/1973 France .
2253723 4/1975 France .
54-131043 10/1979 Japan ............................ 65/3 A Primary Examiner—Robert L. Lindsay, Jr.
Attorney, Agent, or Firm—Pennie & Edmonds

[57] ABSTRACT

The invention provides a method for preparing a preform for producing by drawing an optical waveguide comprising a core region and a sheath region whose refractive index varies in the radial direction, so that the index of the former is greater than those of the second. The method consists in starting from a bar of a first composition for forming the core region and in forming, by means of a plasma torch, on its surface, a deposit of a plurality of layers whose composition varies in the radial direction, is characterized in that glass powder is fed to said torch transversely to the jet of said torch; in that said bar is drawn after each layer is deposited to bring its diameter to a value close or equal to the initial diameter; and in that the chemical composition of the glass powder is changed after each layer is deposited. The preform obtained by the present method makes it possible to produce by drawing optical waveguides for applications in the field of information transmission.

6 Claims, 7 Drawing Figures

METHOD FOR PREPARING A PREFORM FOR OPTICAL WAVEGUIDES

DESCRIPTION

1. Technical Field

The present invention relates to a method for preparing a preform for draw-forming an optical waveguide having a core region and a sheath region whose chemical composition varies in the radial direction, so that the refractive indices in the core region are greater than the refractive index in the sheath region.

2. Background Art

There are a variety of methods currently in existence which are used to obtain preforms for making optical waveguides.

Thus, it is known to obtain a gradient of refractive index by submitting the preform to an ion exchange process. This method has several drawbacks. For one thing, the ion exchange process takes place only in a very thin layer and for this reason it is very difficult to control the refractive index gradient; in addition, the percentage of impurities is such that the degree of attenuation is undesirably high.

It is also known to obtain a preform by hydrolysis of a gas mixture in the flame of a blow torch. Such methods consist, for example, of sending a mixture of halogenated silicon and titanium compounds through a flame where they are oxidized by the oxygen or an oxygenated compound. The silicon and titanium oxide particles obtained in this reaction are deposited on the preform which is heated by a flame. A sheath whose chemical composition varies radially is obtained by progressively changing the composition of the gas mixture. This method, although interesting, nevertheless has certain disadvantages: each deposited layer is quite thin (a few dozen microns) and it is necessary to frit the deposited oxide particles in order to obtain a homogeneous vitrified layer. Moreover, it it necessary to machine the initial preform very precisely in order to obtain a uniform deposit.

According to French Pat. No. 2,178,175 another method consists of depositing several layers of a glass frit, with each layer having a progressively different composition, on the surface of an element which is practically cylindrical, in such a manner that the structure obtained has a composition which varies incrementally or by stages in the radial direction. This procedure, which is not described but simply mentioned, is considered a generalization of the aforementioned method of hydrolyzing a gaseous mixture in a flame and therefore suffers the same drawbacks as noted above.

French Pat. No. 2,253,723 describes a method of projecting glass powder onto a cylindrical support (in the form of a tube or bar) but is limited to the production of optical waveguide preforms with step-wise variation in the refractive index. In addition, the technique used is complicated; it requires special equipment and the granulometry of the projected glass powder is excessively fine, which makes it necessary to provide thorough protection of the glass against contamination before and after it has been deposited on the preform.

In general, all previously known methods are based on projecting very fine particles in order to obtain the highest possible homogeneity of each layer deposited. Such methods are time consuming and expensive because, as the thickness of each layer is very small, many deposits have to be made to obtain a sufficient coating.

In any case, the preforms obtained in this manner are small and do not permit the manufacture of very long continous waveguides.

It is the purpose of the present invention to eliminate these difficulties by a relatively simple and inexpensive method.

DISCLOSURE OF INVENTION

The invention provides a method for preparing a preform for producing, by drawing, an optical waveguide, such preform comprising a core region and a sheath region whose composition varies in the radial direction, so that the index of the former is greater than those of the second. The method comprises providing a bar of a first composition for forming the core region and forming, by means of a plasma torch, on the surface of said bar a deposit of a plurality of layers whose composition varies in the radial direction, characterized in that glass powder is fed to said torch by simple gravity transversely to the jet of said torch; the bar is drawn after each layer is deposited to bring its diameter to a value close or equal to the initial diameter; and the chemical composition of the glass powder is changed after each layer is deposited.

The method of the invention has the advantage of permitting the rapid production of a preform of large size by directly forming homogeneous glass layers and simultaneously avoiding to the maximum extent the danger of contaminating the glass.

A raw bar is placed on a preform support adapted to move the bar in the flame of a high frequency plasma torch in a combination of a reciprocating translation movement and a rotary movement. The speed of these translation and rotational movements is adjustable so that a uniform deposit can be obtained on the entire surface of said bar.

The preform support is itself mounted on a support which can be given a progressive movement away from the tip of the plasma torch. The axis of the torch is perpendicular to the axis of rotation of the bar.

A powder dispenser disposed above the torch makes it possible to have the powder drop into the jet of the torch transversely to the direction in which the flame propagates. The glass powder carried along by such flame is projected onto the heated surface of the bar and immediately forms a homogeneous vitreous layer.

On the cylindrical bar, which initially has a diameter $D_0$ and a length $L_0$, a first layer of glass is deposited containing a doping element at a concentration $C_1$ and with a refractive index $n_1$ smaller than that of the bar ($n_0$). The uniform thickness of such first layer is equal to $e_1$.

The bar, whose diameter is now $D_1 = D_0 + 2e_1$, is the hot drawn to bring its diameter to a value close to or equal to $D_0$.

On the bar thus drawn, a second layer with a thickness $e_2$ is deposited which consists of glass containing the same doping element in concentration $c_2$ and having an index $n_2$ which is smaller than $n_1$. Then the bar is again drawn to bring its diameter to a value close to or equal to $D_0$.

This operation is repeated p times, p being, for example, equal to 10.

At the end of these operations, a preform is obtained which consists of a core region having a refractive index $N_0$, surrounded by a series of layers consisting of glasses having refractive indices $n_1$, $n_2$ ... $n_p$. This preform is therefore of the type in which the index varies or changes incrementally or in steps.

It is, however, obvious that one can choose glasses containing a doping element whose concentrations $c_1$, $c_2 \ldots c_p$ are so close together that the steps in the concentration are relatively small.

In addition, the depositing of the glass powder and the drawing of the bar are performed at a very high temperature, which aids the diffusion of the doping element between two succeeding layers, thus ensuring a progressive transition between said layers.

The manufacture of the preform is completed by depositing a final glass layer with a composition different from that of the first p layers and which serves as a protective layer.

BRIEF DESCRIPTION OF THE DRAWINGS

The practice of the method according to the invention will be shown by two examples and illustrated by the following drawings wherein.

BEST MODE FOR CARRYING OUT THE INVENTION

Figure 4:
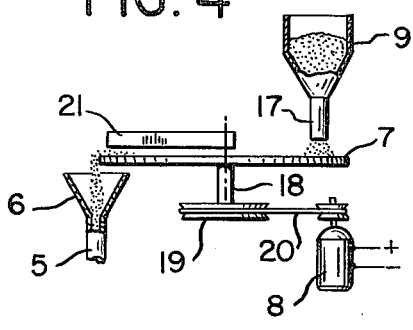
FIG. 4 is a schematic view of a section through the upper portion of the feeding device for the glass powder.

The feeding device for the glass powder is shown in FIG. 4. Hopper 9 filled with glass powder is located above a circular plate 7. The granulometry of the glass particles is between about 75 and 300 microns, preferably between about 75 and 125 microns.

Plate 7 describes a rotary motion around vertical axis 18 carrying at the bottom grooved pulley 19. Pulley 19 is driven by belt 20 which in turn is driven by a variable-speed electric motor 8.

The lower part of hopper 9 is a cylindrical nozzle 17 whose end is located a few millimeters above the surface of plate 7. The powder is discharged from hopper 9 in the shape of a circular bead.

Fixed scraper 21, located close to the top surface of plate 7, pushes the glass powder into a funnel 6. The amount of glass delivered is controlled by the rotational speed of plate 7.

Figure 1:
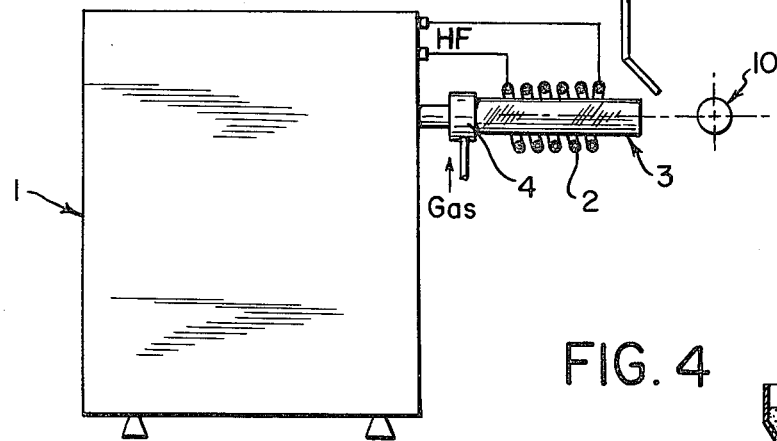
FIG. 1 is a schematic view of a section through the plasma torch and part of the feeding device for the glass powder.

Funnel 6 extends downward in the form of an L-shaped cylindrical pipe 5 of transparent silica, shown schematically in FIG. 1. The lower part of tube 5 is 200 to 500 millimeters long and forms an angle of 30° to 60°, and preferably of 45°, with the horizontal.

This arrangement reduces the falling speed of the glass particles and gives them a discharge velocity of the order of 1 m/sec.

The heat source is a plasma generator of the induction type comprising an electric power source 1 supplying a high frequency current at high voltage (2 megahertz–10 kilovolts). This current flows through induction coil 2 consisting of a copper tube cooled by water circulation and which surrounds transparent silica tube 3. Depending on the high frequency power and the plasma-generating gases used, the diameter of the silica tube is chosen between 40 and 60 mm. This tube is supported by a metallic part 4, cooled by water circulation. Said part 4 is also used to inject the plasma-generating gases into the silica tube. The plasma-generating gases used are, for example: argon, nitrogen, oxygen, or their mixtures. These gases are supplied from high-pressure bottles equipped with reducing valves and flow meters which are not shown in FIG. 1. Air represents a particularly interesting example of an oxygen/nitrogen mixture; it is supplied by a compressor via a cleaning and drying column which are not shown on the drawings.

The silica tube where the inductive plasma forms can have several orientations in a vertical plane which is perpendicular to the axis of rotation of bar 10. In FIG. 1 the silica tube is located horizontally, so that it can be shown easier in the drawing.

Figure 2:
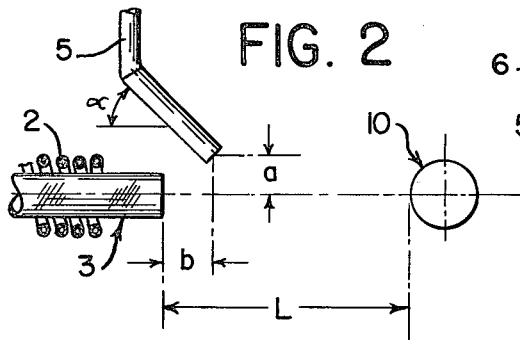
FIG. 2 is a schematic view of a section showing the relative positions of the tip of the torch, of the discharge orifice of the glass powder dispenser and of the bar.

The relative position of the discharge end of silica tube 3, the end of pipe 5 and bar 10 is shown in FIG. 2. A particularly advantageous arrangement is obtained with the following settings: $\alpha = 45°$; $a = 10$ mm; $b = 30$ mm; $l = 150$ mm.

The grains of glass falling into the plasma flame are carried by the latter in the form of fine droplets which attach themselves to the preform.

The longitudinal axis of bar 10 is placed in a horizontal position and perpendicular to the axis of the plasma torch which remains in a stationary position. Said bar describes a triple motion: a rotational motion around its axis, a reciprocating translation movement parallel to this axis and a translation movement perpendicular to its axis.

In order to accomplish this, bar 10 is held at its ends by two chucks 15 and 16 of a conventional glassmaker's lathe 14. This glassmaker's lathe is mounted on four wheels 22 which rest on two rails 13 which are perpendicular to the axis of bar 10. Rails 13 are mounted on carriage 12 which moves in turn on rails 11 placed parallel to the axis of bar 10.

Figure 3:
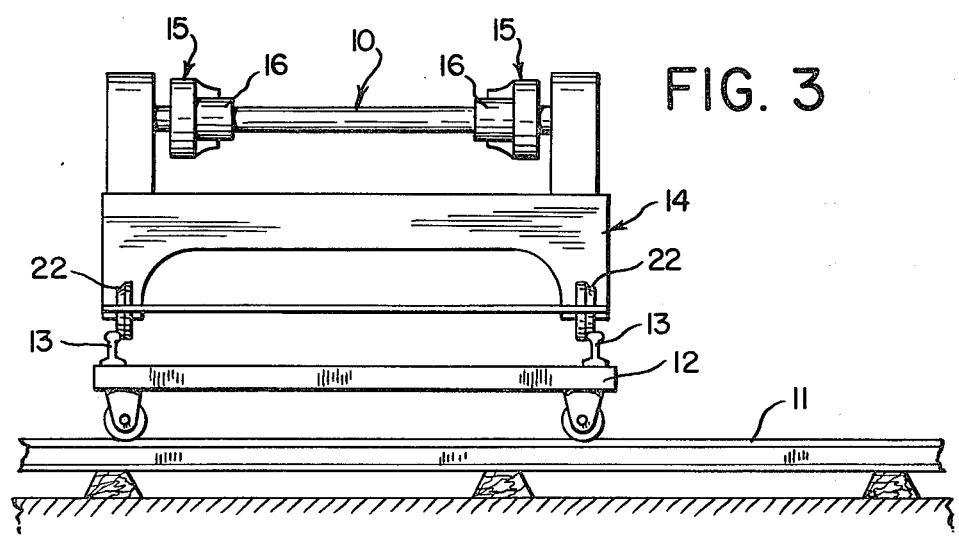
FIG. 3 is a schematic view of a section through the device which ensures the various movements of the bar.

The various motions are powered by variablespeed electric motors, not shown in FIG. 3; depending on the diameter of bar 10, its rotational speed varies between 10 and 100 rpm; the translation speed on rails 11 can vary between 10 and 100 millimeters per minutes. An optical device (not shown in FIG. 3) continually measures the increase in the diameter of the bar; this optical sensing device controls an electric motor which actuates the translation movement of glassmaker's lathe 14 on rails 13.

After each layer is put down, bar 10 is drawn in order to reduce its diameter to a value close to or equal to its initial diameter. This drawing operation can, for example, be performed in an electric oven according to the method described in French Pat. No. 1,108,060 or on a glassmaker's lathe using a ring-shaped torch fed by a hydrogen-oxygen or propane-oxygen mixture.

EXAMPLE 1

In accordance with methods well known in the art, several glasses, $C_1$, $C_2$, $C_3$ and $C_4$, with the following compositions in percent by weight are prepared from very pure ingredients:

TABLE I

| Composition | SiO$_2$ | B$_2$O$_3$ |
|---|---|---|
| C$_1$ | 95 | 5 |
| C$_2$ | 90 | 10 |
| C$_3$ | 85 | 15 |
| C$_4$ | 80 | 20 |

These glasses are ground to a granulometry of between 75 and 125 microns, placed in sealed containers and kept in a drying chamber at 45° C., to prevent any attack by atmospheric moisture.

One starts with a cylindrical bar of very pure silica, 1 m long and with a diameter of 45.7 mm. To each end of this bar a tail piece of silica of ordinary quality is fused, 300 mm long and with a diameter of 90 mm. These tail pieces 16 are gripped in chucks 15 of glassmaker's lathe 14, as shown in FIG. 3. These precautions make it possible to use the entire length of bar 10 for producing the preform.

Bar 10 is progressively heated for a period of 5 minutes by the plasma torch placed at a distance 1 equal to or greater than 300 mm; its rotating speed is equal to 30 rpm and its translation speed is 250 mm per minute. The following settings are then made: $l=100$ mm; $a=40$ mm; $b=20$ mm; $\alpha=45°$. The flow of C$_1$ glass is 300 grams per hour. The operation is stopped when the first layer reaches a thickness of 1.3 mm. The diameter of the bar is then brought back to its initial value by drawing and its length then becomes 1.12 m. A second layer, consisting of glass C$_2$ and 1.15 mm thick is then deposited. After a second drawing operation the length of the bar is 1.24 m.

A third layer, consisting of glass C$_3$, is deposited at a thickness of 1.1 mm and the length of the bar after drawing becomes 1.36 m. A final layer, of glass C$_4$ and a thickness of 1.1 mm, is deposited and the length of the bar after drawing is 1.50 m.

The preform produced by this method is then coated with a layer of vitreous silica of regular quality which fulfills several roles: it protects the preform from any chemical attack; prevents losses caused by volatilization during transformation of the preform into rods and then into fibers; it generates a compressive stress in the outer layer of the fiber due to the difference between the expansion coefficient of silica and those of the various glasses deposited on the bar and it increases the mechanical strength.

This silica layer is deposited as a powder with a granulometry of the order of 250 microns by means of the method described above. The flow rate of the silica powder is adjusted so that it is deposited at the rate of 750 grams per hour.

In this example, the depositing operation is stopped when the diameter of the preform reaches 80 mm.

Figure 5:
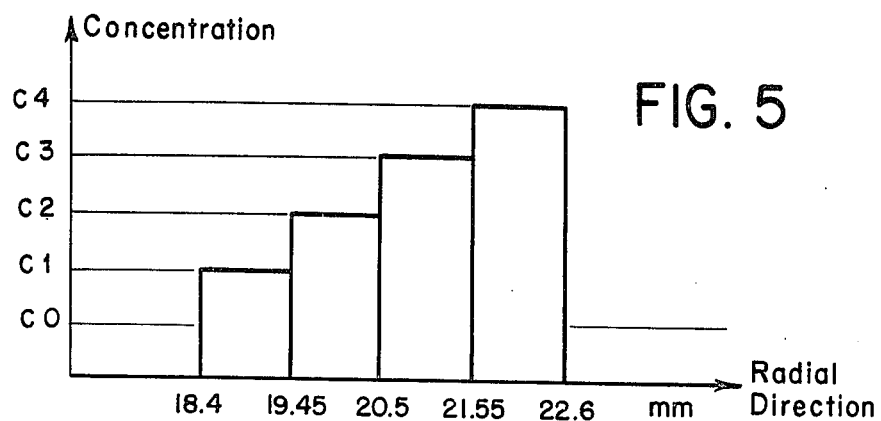
FIG. 5 is a graph showing the structure of the completed preform.

Finally, a 1.5 m long preform is obtained which consists of a core of very pure silica with a diameter of 36.8 mm, covered by four layers C$_1$, C$_2$, C$_3$, C$_4$ of 1.025 mm thickness and an outside layer of vitreous silica with a thickness of 17.5 mm. The theoretical structure of this preform is schematically shown by FIG. 5.

Figure 6:
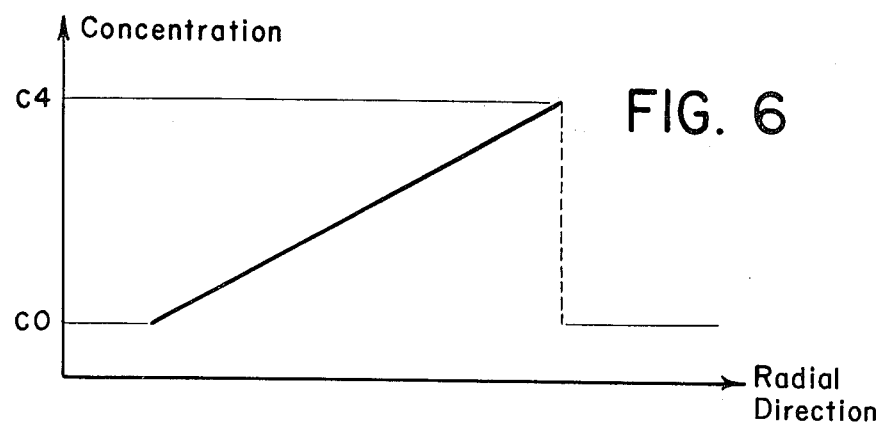
FIG. 6 is a graphic representation of the actual structure of the preform made according to Example 1.

Actually, the successive drawings undergone by the preform cause sufficient diffusion to obtain a practically continuous variation of concentration in the radial direction. The actual structure of the preform is close to that shown schematically in FIG. 6. The preform obtained in this manner weighs 16.6 kg and makes it theoretically possible to draw 160 km fibers of 200 microns diameter. In practice it is possible to obtain from such a preform a 50-km long fiber in one piece, which is a great advantage.

EXAMPLE 2

Ten glasses are prepared from very pure components which belong to the binary system SiO$_2$—B$_2$O$_3$. C$_1$ and C$_{10}$, the glasses at the two ends of this range, have the following percentage compositions by weight, respectively: SiO$_2$=98%; B$_2$O$_3$=2% and SiO$_2$=80%; B$_2$O$_3$=20%. The other glasses are intermediate compounds obtained by varying the respective percentages of SiO$_2$ and B$_2$O$_3$ by 2%.

The operation is also started with a bar of very pure silica, with a length of 1 m and a diameter of 50 mm. The same settings are used as in the Example 1. The thickness of each layer deposited is shown in Table II.

TABLE II

| Compound | Thickness (in mm) |
|---|---|
| C$_1$ | 22.5 |
| C$_2$ | 17.9 |
| C$_3$ | 14.2 |
| C$_4$ | 11.3 |
| C$_5$ | 8.95 |
| C$_6$ | 7.1 |
| C$_7$ | 5.65 |
| C$_8$ | 4.5 |
| C$_9$ | 3.6 |
| C$_{10}$ | 2.8 |

After each layer is deposited, the bar is drawn to bring its diameter back to a value close to or equal to that of the initial diameter.

Without going into the detailed computation of the length obtained after each layer is deposited, it is obvious that the maximum bed length of the glassmaker's lathe represents a limit to the operation. It may therefore be necessary to cut the preform in two between two successive deposits. The intermediate preforms obtained in this manner are then processed separately and the sequence of deposits chosen originally is maintained.

Just as in example No. 1, the preform is covered with a layer of vitreous silica of ordinary quality in the last operation of the manufacturing process.

The final preform consists, therefore, of a core of very pure silica with a diameter of 5 mm surrounded by ten layers of compounds C$_1$ to C$_{10}$, 2.25 mm thick, and an outside layer of vitreous silica, 15 mm thick.

Figure 7:
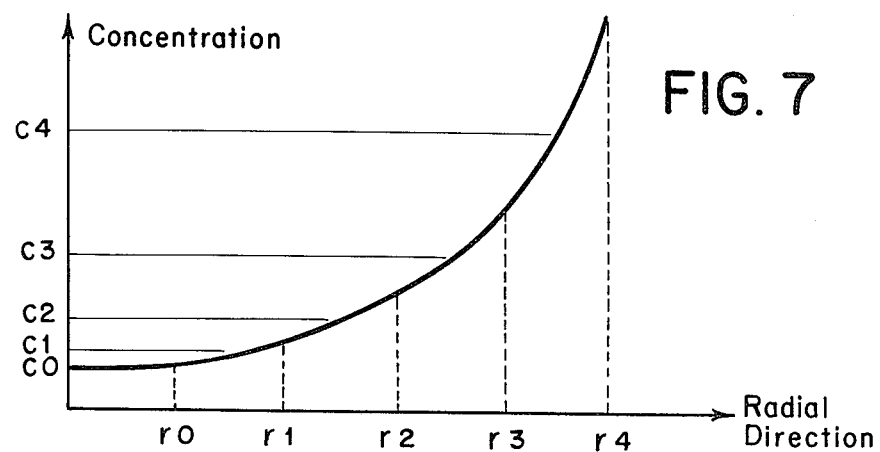
FIG. 7 is a graphic representation of the actual structure of the preform made according to Example 2.

As in Example 1, the successive drawings cause diffusion between successive layers. This leads to a radial variation of the concentration such as the one shown for the first four layers by FIG. 7.

It is well understood that these examples are only given for purposes of illustration and not of limitation and that any desired changes can be made therein regarding the nature of the chosen constitutents as well as the thickness and the number of the layers deposited, without thereby departing from the scope of the invention which is defined in the following claims.

I claim:

1. A method for producing a preform for an optical waveguide having a core surrounded by a sheath with a lower refractive index which varies radially, said method comprising depositing by means of a plasma torch a plurality of layers of different composition on a bar forming a core region, wherein glass powder is fed to the torch by gravity transversely to the jet of said torch, said bar being drawn after the deposition of each layer so that its diameter is brought to a value equal or at least close to the initial diameter, the chemical composition of the glass powder being modified after each layer is deposited.

2. A method according to claim 1, wherein the granulometry of the projected glass powder is between 75 and 300 microns.

3. A method according to claim 2 wherein the projected glass powders comprise the binary system $SiO_2$—$B_2O_3$.

4. A method according to claim 3, wherein the projected glass powders comprise at least 80% by weight of $SiO_2$.

5. A method according to claim 1, 2, 3 or 4 wherein the projected glass powder constituting the last deposited layer is pure silica.

6. A method according to claim 1, 2, 3 or 4 wherein the core region consists essentially of pure silica.

* * * * *